UNITED STATES PATENT OFFICE.

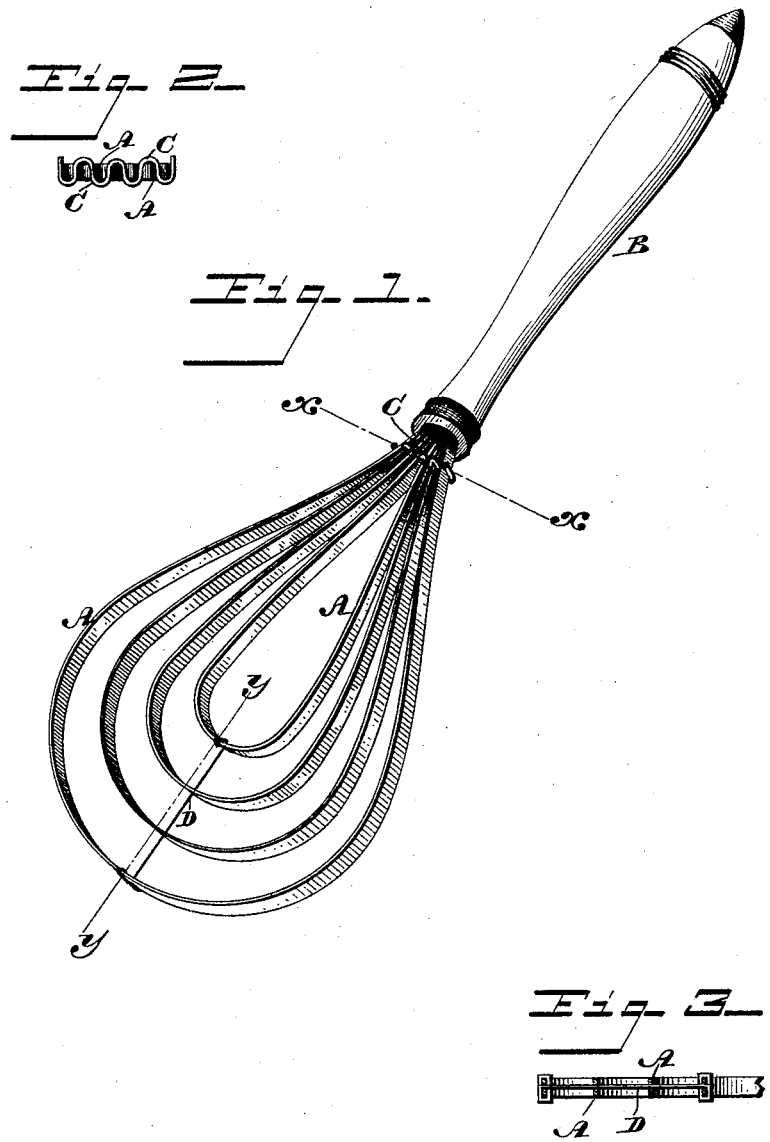

GEORGE N. FOSTER, OF PHILADELPHIA, PENNSYLVANIA, ASSIGNOR TO THE AMERICAN MACHINE COMPANY, OF SAME PLACE.

BEATER FOR EGGS, &c.

SPECIFICATION forming part of Letters Patent No. 453,998, dated June 9, 1891.

Application filed August 21, 1890. Serial No. 362,599. (No model.)

*To all whom it may concern:*

Be it known that I, GEORGE N. FOSTER, a citizen of the United States, residing in the city and county of Philadelphia, State of Pennsylvania, have invented a new and useful Improvement in Beaters for Eggs, &c., which improvement is fully set forth in the following specification and accompanying drawings.

My invention consists of a beater for eggs, cream, &c., having a series of separated bows with means for preventing the same from closing on each other, whereby the beating is effectively performed and the device is stiffened and strengthened, the bows being ovoid and having their widest portions at the end opposite to the handle, so as to present the greatest surface to the material to be beaten or whipped.

Figure 1 represents a perspective view of a beater embodying my invention. Fig. 2 represents a section on line x x, Fig. 1. Fig. 3 represents a section on line y y, Fig. 1.

Similar letters of reference indicate corresponding parts in the several figures.

Referring to the drawings, A designates a a number of bows formed of strips of suitable metal or material, preferably clock-spring steel, the same being of different sizes, one within the other, and secured to the handle B. The bows are ovoid or oval shape, their widest portions being at the outer end of the device, so as to present thereat the greatest surface to the material to be beaten, as the work of beating or whipping is most effectively performed at the end of a beater. Furthermore, the bows are of the form of strips which present their sharp or narrow edge to the material, it being understood that a cutting action on the material is most effective and produces the best and quickest results. At the ends of the bows where they are connected with a handle is a corrugated or crimped piece of wire or other material, forming a shackle C, the same receiving the adjacent portions of the bows and having its ends embracing the contiguous portion of the outer bow in such manner that the bows are prevented from separating near the handle of the device and the shackle is held in position.

D designates a piece of wire or other material, which is passed through or around the crowns of the several bows and having its ends secured to the inner and outer bows, by which provision said crowns are prevented from closing on each other, and thus caused to retain their normal position or condition as spaced, so that when the device is in operation the beating of eggs or other material may be effectively accomplished, it being evident that as the bows are held properly separated the beating portion of the device presents a large surface to the material, it being also evident that the bows are stiffened and strengthened by the attachments at their ends and crowns.

Having thus described my invention, what I claim as new, and desire to secure by Letters Patent, is—

An egg-beater having a series of flexible strips, one within the other, a separating and connecting piece secured to the crown of said strips, and a shackle secured to the gathered ends of the said strips, said parts being combined substantially as described.

GEO. N. FOSTER.

Witnesses:
JOHN A. WIEDERSHEIM,
A. P. JENNINGS.